United States Patent
Kwak et al.

(10) Patent No.: US 10,124,444 B2
(45) Date of Patent: Nov. 13, 2018

(54) FLUX CORED WIRE AND MANUFACTURING METHOD THEREOF AND MANUFACTURING DEVICE THEREOF

(71) Applicants: Hee Jin Kwak, Jangyu Myun Kimhae (KR); Young Su Kim, Chongwon (KR)

(72) Inventors: Hee Jin Kwak, Jangyu Myun Kimhae (KR); Young Su Kim, Chongwon (KR)

(73) Assignee: ALLOY RODS GLOBAL, INC., Wilmington, DE (US)

( * ) Notice: Subject to any disclaimer, the term of this patent is extended or adjusted under 35 U.S.C. 154(b) by 293 days.

(21) Appl. No.: 14/380,739

(22) PCT Filed: Apr. 17, 2013

(86) PCT No.: PCT/US2013/036883
§ 371 (c)(1),
(2) Date: Aug. 25, 2014

(87) PCT Pub. No.: WO2013/162960
PCT Pub. Date: Oct. 31, 2013

(65) Prior Publication Data
US 2015/0044506 A1    Feb. 12, 2015

(30) Foreign Application Priority Data

Apr. 26, 2012 (KR) .................. 10-2012-0043854

(51) Int. Cl.
*B23K 35/02* (2006.01)
*B23K 35/40* (2006.01)

(52) U.S. Cl.
CPC ........ *B23K 35/0266* (2013.01); *B23K 35/406* (2013.01); *B23K 2035/408* (2013.01);
(Continued)

(58) Field of Classification Search
CPC ................... B23K 35/406; B23K 2035/408
(Continued)

(56) References Cited

U.S. PATENT DOCUMENTS 3,345,495 A * 10/1967 Quaas ................ B23K 35/0216
219/145.22
4,048,705 A    9/1977 Blanpain et al.
(Continued)

FOREIGN PATENT DOCUMENTS

AU    608327 B2    3/1980
EP    0489167 A1    11/2009
(Continued)

OTHER PUBLICATIONS

International Preliminary Report on Patentability, dated Nov. 6, 2014 for PCT/US2013/036883 filed Apr. 17, 2013.
(Continued)

*Primary Examiner* — Dana Ross
*Assistant Examiner* — Kuangyue Chen
(74) *Attorney, Agent, or Firm* — Edell, Shapiro & Finnan, LLC

(57) ABSTRACT

The present invention relates to a flux cored wire and the method and apparatus for manufacturing the same. The flux cored wire in accordance with the present invention can prevent the flux filled inside strip from leaking out and the moisture in the atmosphere from penetrating into the flux. The method of the present invention also does not require longer processing time. For this, the flux cored wire in accordance with the present invention is comprised of: an inner tubular body formed with flat strip by curling up the side edges of the strip into a tubular body having a seam and filed with flux inside; and an outer tubular body formed with
(Continued)

flat strip by curling up the side edges of the strip into a tubular body having a seam and wrapping around the inner tubular body in tight contact.

12 Claims, 8 Drawing Sheets

(52) U.S. Cl.
CPC .... *Y10T 29/49201* (2015.01); *Y10T 29/53348* (2015.01); *Y10T 428/12958* (2015.01)

(58) Field of Classification Search
USPC .............. 219/145.22; 428/682; 29/779, 872
See application file for complete search history.

(56) References Cited

U.S. PATENT DOCUMENTS

| | | | |
|---|---|---|---|
| 4,137,446 A | 1/1979 | Blanpain et al. | |
| 4,305,197 A * | 12/1981 | Puschner | B23K 35/0272 219/145.1 |
| 5,854,463 A * | 12/1998 | Yamashita | B23K 35/368 219/145.22 |
| 6,112,395 A * | 9/2000 | Quick | B21C 37/047 29/419.1 |
| 2006/0076336 A1* | 4/2006 | Nagarajan | B23K 9/173 219/145.1 |
| 2007/0017956 A1* | 1/2007 | Karogal | B23K 35/3607 228/101 |
| 2007/0193228 A1 | 8/2007 | Astier | |

FOREIGN PATENT DOCUMENTS

| | | |
|---|---|---|
| JP | S6233095 A | 2/1987 |
| JP | 63101094 U | 6/1988 |
| JP | H01154893 A | 6/1989 |
| JP | H01154895 A | 6/1989 |
| JP | H05293687 A | 11/1993 |
| KR | 100821365 B1 | 4/2008 |
| KR | 20090120803 A | 11/2009 |

OTHER PUBLICATIONS

International Publication WO 2013/162960 and International Search Report dated Oct. 31, 2013 for PCT/US2013/036883.
Examination Report for EP 13782239.1-1373 dated Mar. 22, 2017.
Extended European Search Report for EP 13782239.1-1373 dated Feb. 22, 2016.

* cited by examiner

FLUX CORED WIRE AND MANUFACTURING METHOD THEREOF AND MANUFACTURING DEVICE THEREOF

CROSS-REFERENCE TO RELATED APPLICATIONS

This application claims priority to Korean Patent App. No. 10-2012-0043855, filed Apr. 26, 2012; and International Application No. PCT/US2013/036883, filed Apr. 17, 2013, entitled "Flux Cored Wire and Manufacturing Method Thereof and Manufacturing Device Thereof, the entirety of which applications are incorporated by reference herein.

FIELD OF THE INVENTION

The present invention relates to a flux cored welding wire (FCW), more particularly, the flux cored welding wire with improved hydrogen crack property at low temperature and less porosity in the weldment and the method for preparing the same.

DESCRIPTION OF THE RELATED ART

In general, flux cored wire (hereinafter, "FCW") is a steel wire filled with flux comprising slag forming agent, arc stabilizer, deoxidizer, denitrifier, alloy substances and iron content inside the hollow part of wire for arc welding.

When compared with solid wire, the FCW provides more stable arc, finer and smaller spatter particles, cleaner beads with better spreadability, and the slag is spread thoroughly, and anti-exfoliation and anti-cracking property is excellent. Due to these benefits, FCW is widely used for the butt welding and fillet welding in the ships, vehicles, bridges, architectures and other steel structures.

As shown in FIG. 1, to manufacture the FCW described above, a steel strip 10 wound on a strip feeder is fed and progressively formed into a tubular body by passing through a plurality of primary forming rollers 21 during when the side edges of the strip are bent upwards progressively. The tubular steel strip 10 is filled with flux 30 through the flux hopper 22, and further passed through a multiple number of secondary forming rollers 23, wound into a round, tubular shape, passed through the drawing dies 24 and drawing drums 25, and the finished FCW is wound on the wire reel 26.

However, the FCW produced by the conventional arts described above, as shown in FIG. 2(a) or 2(b), has seam 11 between the bent ends of the strip 10, through which the atmosphere containing hydrogen may enter to be combined with the flux 30 inside, raising the hydrogen content in the welding material which can result in weld defects. In addition, the flux 30 inside the wire may leak out through the seam 11 during welding and deteriorate arc stability.

Conclusively, the conventional FCW is not suitable as a low hydrogen welding material. Here, low hydrogen welding material contains 5 ml or less of hydrogen per 100 g of weldment.

To this end, flux cored wires which have removed the seam 11 by welding are provided. As shown in FIG. 3, such seamless flux cored wires remove the seam 11, as shown in FIG. 3(b) by high frequency resistance welding or laser welding the seam 11 of the strip 10 having passed the secondary forming rollers 23 shown in FIG. 3(a). Here, the device 91 of FIG. 1 is a welder installed to remove the seam 11.

However, in the course of welding the seamless type flux cored wires with high frequency resistance welding method, the flux 30 adheres to the seam 11 due to the strong magnetic field and the vibration generated by the high speed forming work, and welded. Consequently, non-metallic flux frequently causes weld defects, leading to cut off of the wire in the wire drawing process and lower operation efficiency.

The European Patent No. EP 0489167B1 discloses a method which can prevent the productivity degradation due to the weld defect, however, the method requires complicated manufacturing process and high heat treatment cost. Laser welders can be used to dissolve the complicated process where heat treatment processes are performed twice. However, this method also cannot avoid the defect caused by the flux adhering to the seam by the vibration of the process equipment. To solve this problem, Korean Patent Reg. No. 10-0821365 discloses a method where the cross section is formed by overlapping and laser welded.

The Korean Patent Reg. No. 10-987346 discloses a method which the problems of the seamless flux cored wires described above by coating the entire outer surface of the flux cored wires, whose seam is not welded but the strip is bent by overlapping, with liquid resin.

However, this method requires an extra process of curing the liquid resin coating. Because the curing process cannot be performed continuously with the manufacturing process of the flux cored wires, the entire processing time becomes longer. Furthermore, considering that most resins are weak to high temperature, the application of the flux cored wires at high temperature working environment is difficult.

SUMMARY

The purpose of the present invention which is devised to solve the problems of the conventional methods described above is to provide FCW and the method and apparatus for manufacturing the same, stably preventing the leakage of the flux in the wire and infiltration of external humidity and shortening the process time.

In addition, the present invention provides a low hydrogen-content welding material of 5 ml or less of hydrogen per 100 g of weldment, by preventing the source of hydrogen, that is, moisture in the atmosphere from infiltrating into the flux. The present invention also provides the manufacturing process and productivity the same as the conventional methods by enabling seam welding on the outer surface which is required to produce perfect seamless FCW necessary for surface copper coating to obtain stable arc.

The FCW of the present invention devised to achieve the above objects, is characterized by being comprised of: the steel strip formed into a tubular body having a seam and filled with flux inside; and the outer tubular body formed with steel strip and having a seam, wrapping around the inner tubular body.

Here, the seams of the inner tubular body and outer tubular body are arranged at different positions to prevent overlapping.

In addition, the seams of the inner tubular body and outer tubular body are arranged at different positions away from each other by at least 60 degrees from the center of the tubular bodies.

In addition, the FCW of the present invention is further characterized by the outer tubular body being formed in a seamless structure by removing the seam of the outer tubular body by welding.

The manufacturing apparatus for the FCW in accordance with the present invention is characterized by being comprised of: A first strip feeder which feeds the steel strip from a strip roll for forming an inner tubular body; a second strip feeder which feeds the steel strip from a strip roll for forming an outer tubular body; a first forming portion of the first forming station which progressively bends upward the right and left side edges of the strip fed from the first strip feeder to form an inner tubular body having a part of the outer surface is open; a flux filling portion which fills flux into the inner tubular body formed in the first forming portion and a part of which is open; a first closing portion where the open part of the inner tubular body filled with the flux is contacted with each other; a second forming station which progressively bends upward the right and left sides of the strip fed from the second strip feeder to form an outer tubular body which wraps around the outer surface of the inner tubular body formed in the first closing portion; and a drawing portion which draws the outer tubular body formed in the second forming portion into FCW.

Here, the first and the second forming stations comprise a plurality of forming rollers which process the strips into tubular bodies, respectively, and the forming rollers consisting the closing portion of the first forming station and the forming rollers consisting the second forming station form the inner tubular body and the outer tubular body in an arrangement where their seams formed by the side edges of the strips are not at the same position.

In addition, the forming system further comprises a welder which welds the seam of the outer tubular body formed by the second forming station, between the second forming station and the drawing portion.

The manufacturing method of the FCW in accordance with the present invention is characterized by being comprised of the steps of: the first step which forms a steel strip into an inner tubular body having hollow space inside and an open seam in the circumference, by bending the side edges progressively upwards; the second step which fills flux into the inner tubular body formed in the first forming step through the open seam; the third step which presses the open seam of the inner tubular body filled with flux in the second step, so that the side edges adhere close together; the fourth step which forms an outer tubular body by progressively bending upwards the side edges of a strip, wrapping around the inner tubular body formed in the previous step; and the fifth step which forms FCW by drawing the outer tubular body to reduce the diameter progressively.

Here, the positions of the seams of the inner and outer tubular body formed by the side edges of the strips in the fourth step are characterized by being apart from each other.

In addition, the method further comprises a welding step which welds the seam of the outer tubular body formed in the fourth step to form seamless structure, before the fifth step.

The FCW in accordance with the present invention can stabilize the weld arc and wire feedability by preventing the moisture, which is the cause of high hydrogen content, in the atmosphere from entering the flux and the flux from leaking out during welding, because the FCW has a double tubular body structure and the seams of the tubular body are at different positions.

In addition, since the seam of the outer tubular body can be removed by welding, seamless type flux cored wires can be manufactured.

In addition, according to the method and apparatus for manufacturing the FCW in accordance with the present invention, the FCW having double tubular body structure can be manufactured and all of the equipments can be arranged in a continuous process system, providing the benefits of simplified line structure and improved productivity.

DETAILED DESCRIPTION

The apparatus and method for flux cored wires in accordance with the present invention are described in further details below by referring to the accompanying drawings of FIG. 4 to FIG. 8.

Figure 1:
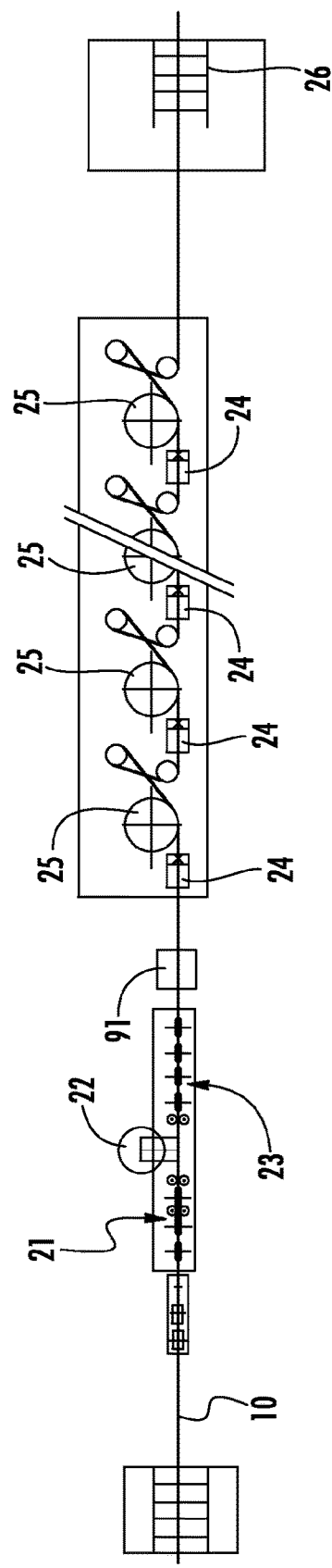
FIG. 1 is a structural view showing the manufacturing system of the flux cored wires in accordance with the conventional arts.
Figure 2A:
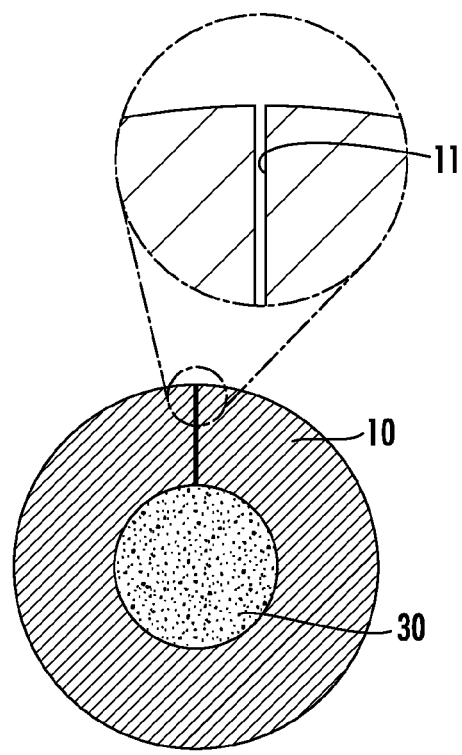
FIG. 2 is a cross sectional view showing the internal structure of the flux cored wires having seams manufactured in accordance with the conventional arts.
Figure 2B:
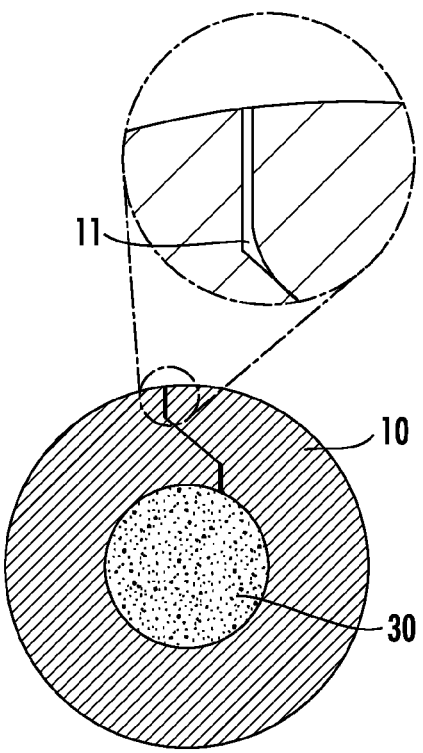
Figure 3A:
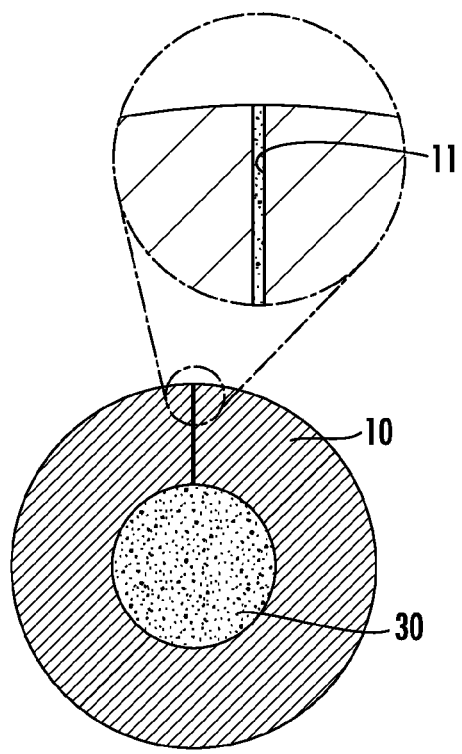
FIG. 3 is a cross sectional view showing the internal structure of the seamless type flux cored wires without seams manufactured in accordance with the conventional arts.
Figure 3B:
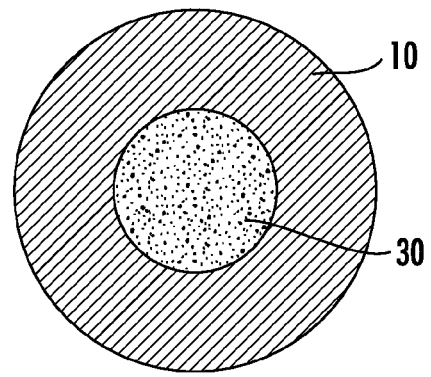
Figure 4:
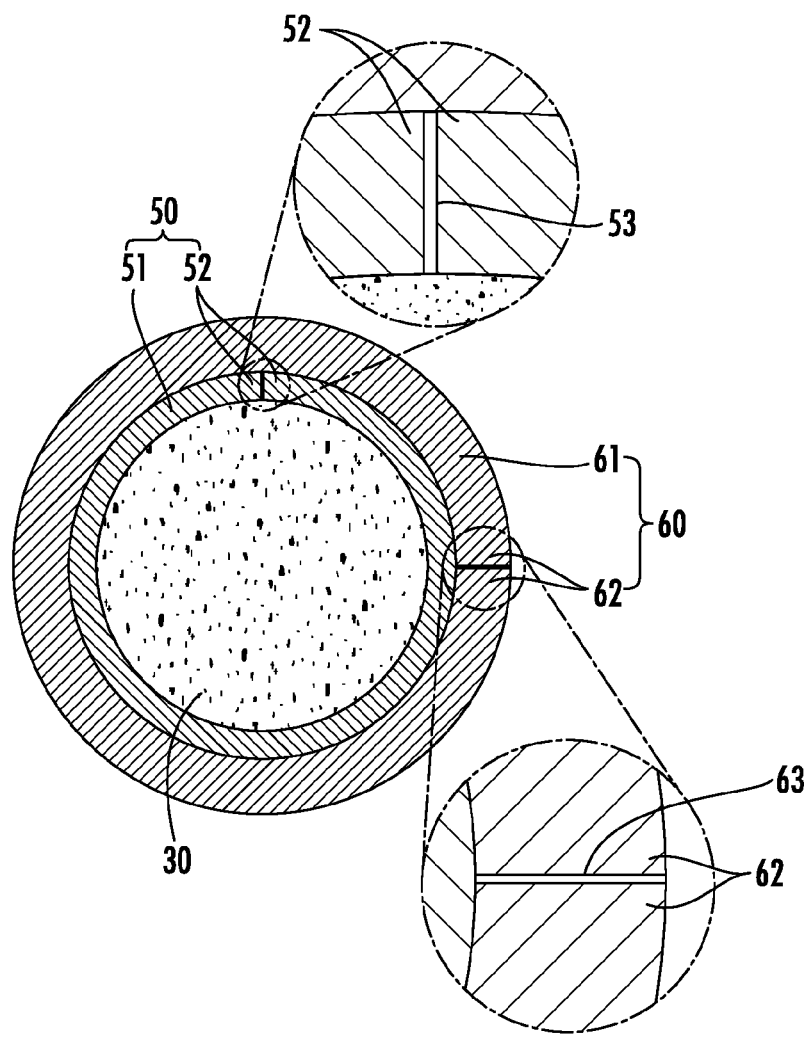
FIG. 4 is a cross sectional view showing the internal structure of the flux cored wires having seams manufactured in accordance with a preferable embodiment of the present invention.

FIG. 4 shows the cross sectional view of the FCW in accordance with a preferable embodiment of the present invention.

As shown in the figure, the FCW in accordance with an embodiment of the present invention is substantially characterized by being structured with an inner tubular body 50 and an outer tubular body 60.

The structure is described in further details by the structural components.

Firstly, the inner tubular body 50 is forming the inner portion of the wire and filled with flux 30 inside.

The inner tubular body 50 is formed by bending the side edges 52 of strip 51 and adhering them together to have a circular cross section, and the both ends 52 of the inner tubular body 50 form a seam 53 having very narrow gap. Here, both ends 52 of the inner tubular body 50 may be formed with overlapping portion a shown in FIG. 5. In this case, the position of the seam 53 is the tip of the end placed on the outer surface.

In addition, the quantity of the flux 30 filled in the inner tubular body 50 is preferably 30~40 wt % of the total weight including the inner tubular body 50.

This is to prevent the weld defects which may be caused in the welding works carried out using the FCW by short filling ratio (less than 30%) and the trouble in the FCW manufacturing process due to excessive filling ratio (more than 40%) and secure the ratio of the flux 30 to the entire weight of the FCW including the outer tubular body 50 within the preferable range between 12~15%.

Here, the weld defect due to excessive ratio of flux 30 refers to the degradation of productivity caused by cut off of the wire in the drawing process due to excessive flux 30 ratio.

The outer tubular body 60 which is the outer circumference of the wire, wraps the inner tubular body 50 to prevent flux 30 from leaking out through the seam 53 of the inner tubular body 50 and the moisture in the atmosphere from entering the flux.

The outer tubular body 60 is formed by bending the side edges 62 of strip 61 and adhering them together to have a circular cross section, and wraps over the outer circumference of the inner tubular body 50.

Here, the ends 62 of the outer tubular body 60 forms a seam 63 having very fine gap.

In the embodiments of the present invention, the seam 53 of the inner tubular body 50 and the seam 63 of the outer tubular body 60 are substantially arranged at different positions.

By arranging the two seams 53 and 63 at different positions, the flux 30 cannot leak out through the seam 53 of the inner tubular body 50 and the atmosphere containing moisture cannot penetrate into the flux 30 through the seam 63 of the outer tubular body 60.

For the FCW products whose seam 63 of the outer tubular body is not welded, the seam 53 of the inner tubular body 50 and the seam 63 of the outer tubular body 60 are preferably separated by at least 60 degrees with reference to the centers of the tubular bodies 50 and 60. If the clearance angle between the two seams 53 and 63 is 60 degrees or less, the sealing effect of the outer tubular body may be insufficient due to the short distance between the seam 53 of the inner tubular body 50 and the seam 63 of the outer tubular body 60.

Considering the productivity of the manufacturing process and the guarantee for low hydrogen weld wire system, the clearance angle between the seams 53 and 63 is most preferably about 90 degrees. If the clearance angle between the seams 53 and 63 is greater than 90 degrees, the arrangement and operation of the forming rollers for forming the outer tubular body 60 become complicated and difficult. As such, the clearance angle between the seams 53 and 63 is most preferably about 90 degrees.

In addition, in the preferable embodiment of the present invention, the thickness of the outer tubular body 60 is the same or greater than that of the inner tubular body 50.

This is because, while the outer tubular body 60 is exposed to the environmental impacts, such as wear or external load, the inner tubular body 50 is protected from the environmental impact by the outer tubular body 60 and the only requirement for the inner tubular body is the capability to prevent the flux from leaking out. Consequently, it is desirable that the thickness of the outer tubular body 60 is the same or greater than that of the inner tubular body 50.

Of course, the thicknesses of the inner tubular body 50 and the outer tubular body 60 should be determined appropriately taking the diameter of the whole wire into consideration. For example, in the embodiments of the present invention, the thickness of the strip 61 for the outer tubular body 60 and that of the strip 51 for the inner tubular body 50 are 0.6~1.2 millimeters (mm) and 0.4~0.8 mm, respectively.

The wire in accordance with the embodiment of the present invention described earlier can be considered as a flux cored wire having a seam 63 because the outer tubular body 60 has a seam 63.

Figure 5:
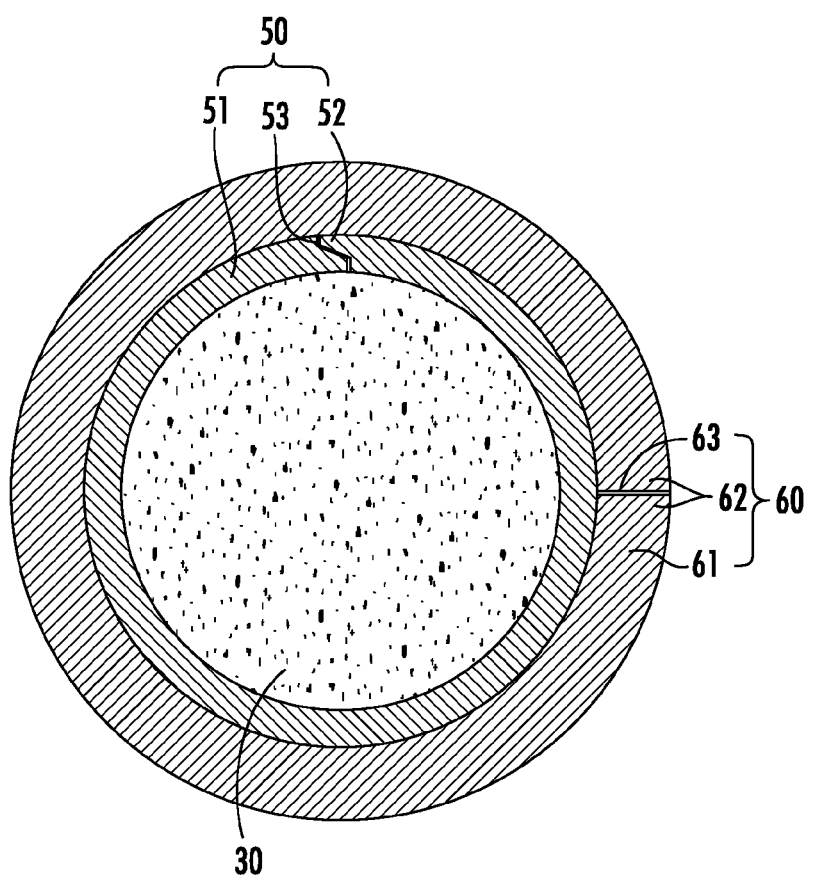
FIG. 5 is a cross sectional view showing the internal structure of the seamless type flux cored wires without seams manufactured in accordance with a preferable embodiment of the present invention.

However, as shown in FIG. 5, the FCW in accordance with the embodiment of the present invention can be produced as s seamless type FCW by removing the seam 63 of the outer tubular body 60 by welding or other appropriate method.

While the wire in accordance with the embodiment of the present invention described earlier can be considered as being consisted with two separate members of the inner tubular body 50 and the outer tubular body 60 which are produced with separate strips 51 and 61, the inner tubular body 50 and the outer tubular body 60 forms substantially an integrated body in the drawing process.

The manufacturing apparatus (hereinafter, "wire processing system") for flux cored wires in accordance with the embodiment of the present invention is described below in detail.

Figure 6:
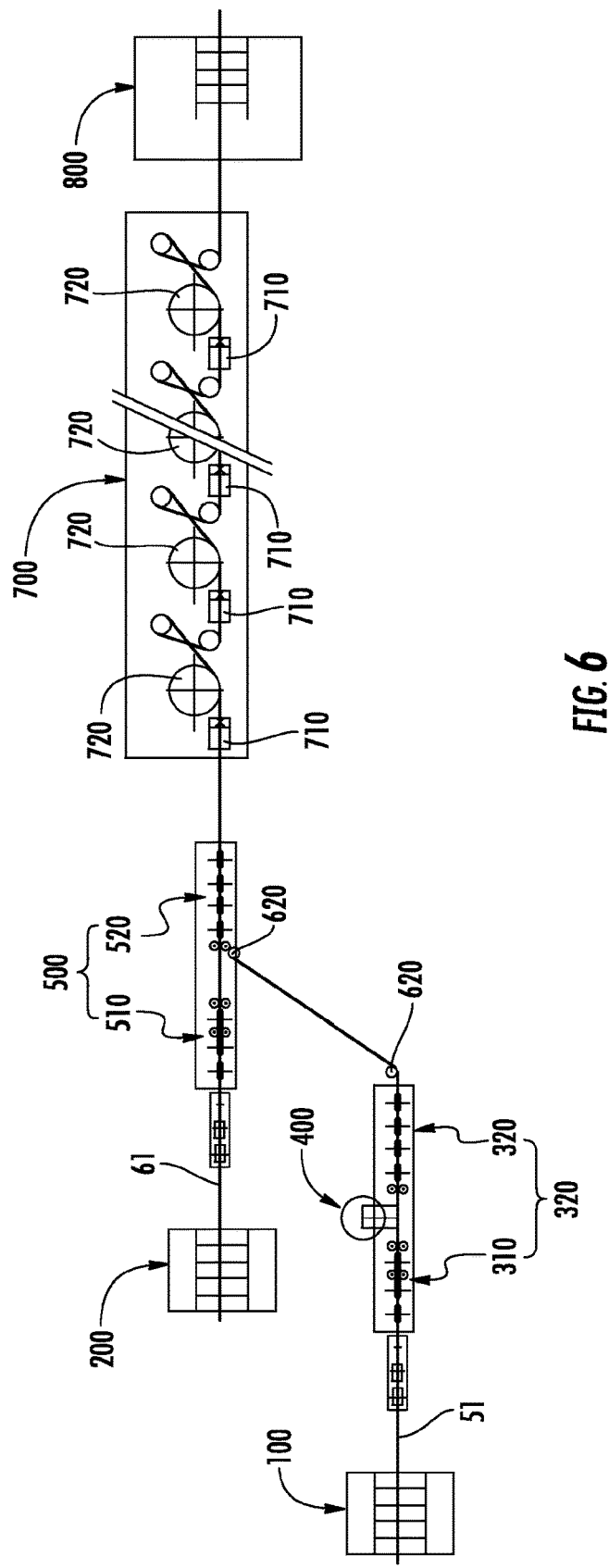
FIG. 6 is a structural view showing the manufacturing system of the flux cored wires in accordance with a preferable embodiment of the present invention.

As shown in FIG. 6, the wire processing system in accordance with the embodiment of the present invention is substantially comprised of a first strip feeder 100, a second strip feeder 200, a first forming station 300, flux filler 400, a second forming station 500 and a drawing portion 700.

The components are described in further details below.

The first strip feeder 100 feeds the steel strip 51 for forming the inner tubular body 50.

The first strip feeder 100 comprises a reel wound with the strip 51 and the thickness of the strip 51 is in the range between from 0.4 to 0.8 mm.

The second strip feeder 200 feeds the steel strip 61 for forming the outer tubular body 60.

The second strip feeder 200 also comprises a reel just like the first strip feeder 100 and the thickness of the strip 61 is in the range between from 0.6 to 1.2 mm.

The first forming station 300 forms the inner tubular body 50 with the strip 51 fed from the first strip feeder 100, wherein the inner tubular body has a partially open slit. The first forming station comprises a first forming portion 310 in the strip feeder side and a first closing portion 320 in the downstream of the flux filler 400 which will be described later.

The first forming portion 310 comprises a plurality of the forming rollers which form the cross section of the strip 51 into a "U" shape. For this purpose, the forming rollers are arranged on the right and left (or up and down) sides of the strip 51 along the feed direction of the strip 51 by pair-structure so that the sides of the strip 51 are bent upwards progressively towards each other.

The flux filler 400 fills the inner tubular body 50 with flux 30 via the open slit formed in the first forming portion 310 and is positioned at the outlet of the first forming portion 310.

The flux filler 400 comprises a flux container (not shown) containing flux 30 and a feed belt feeding the flux 30 to the open slit of the inner tubular body 50.

The first closing portion 320 presses the open slit of the inner tubular body 50 filled with flux 30 towards each other so that the side edges of the strip adheres together tightly, and is positioned at the outlet side of the flux filler.

The first closing portion 320 comprises a plurality of forming rollers (not shown) which form the inner tubular body 50 filled with the flux 30 into a circular tube shape, and the forming rollers are arranged on the right and left (or up and down) sides of the inner tubular body 50 along the feed direction of the inner tubular body 50 by paired-structure.

In the embodiment, the first closing portion 320 presses the side edges 52 of the inner tubular body 50 towards each other. However, a portion of the side edges 52 of the inner tubular body 50 can be formed in an overlapping configuration, as appropriate.

The second forming station 500 forms the outer tubular body 60 with the strip 61 fed from the second strip feeder 200 around the outer surface of the inner tubular body 50 filled with the flux 30 by the flux filler 400. The second forming station is positioned in the outlet side of the first closing portion 320 of the first forming station 300.

The second forming station 500 comprises the second forming portion 510 which forms the cross section of the strip 61 into a 'U' shape and the second closing portion 520 which presses the ends 62 of the strip 61 formed in the second forming portion 510.

The second forming portion 510 and the second closing portion 520 of the second forming station 500 comprise a plurality of the forming rollers which form the strip 61 fed from the second strip feeder 200 into a tubular shape, and the forming rollers are arranged on the right and left (or up and down) sides of the inner tubular body 50 by paired-structure along the feed direction of the inner tubular body 50, discharged from the first closing portion 320.

Especially, the forming rollers comprising the second closing portion 520 are so arranged that the position of the seam 63 formed between the side edges 62 of the outer tubular body 60 is different from the seal 53 formed between the side edges 52 of the inner tubular body 50 which is formed by the first closing portion 320 of the first forming station 300.

Here, the member 620 in FIG. 6 is a guide roll which guides the inner tubular body 50 from the first closing portion 320 of the first forming station 300 into the forming rollers of the second closing portion 520 of the second forming station 500 accurately.

The drawing portion 700 draws the outer tubular body 60 formed in the second forming station 500 to reduce the diameter progressively, into flux cored wire, and positioned in the outlet side of the second forming station 500.

The drawing portion 700 comprises a plurality of dies 710 and drawing drums 720, not shown bur generally used for wire drawing.

In addition, the wire processing system in accordance with the embodiment of the present invention further comprises a wire reel 800 which winds the wire from the drawing portion 700, and the wire reel 800 is positioned in the downstream of the drawing portion 700.

Figure 7:
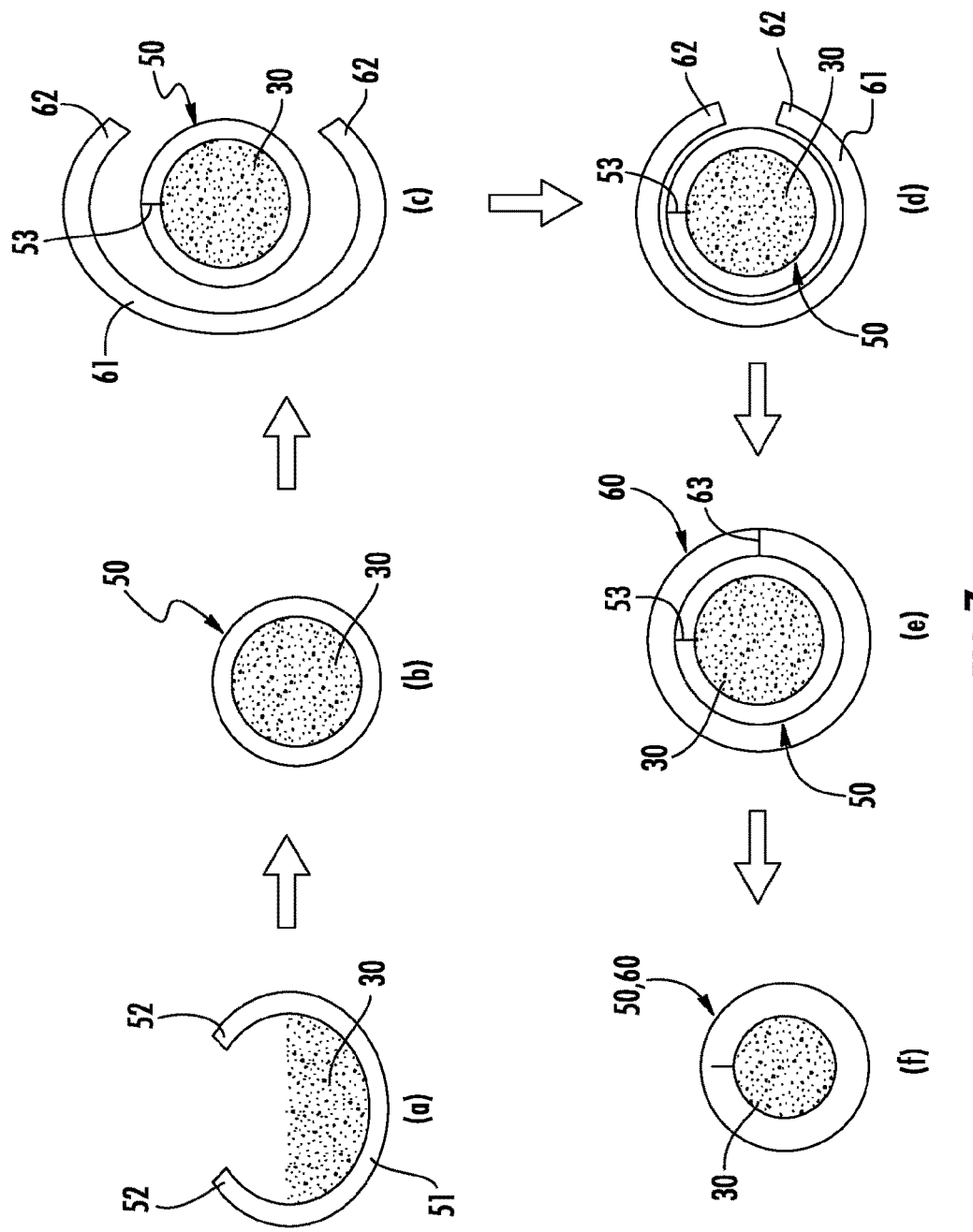
FIG. 7 is a progressive view showing the manufacturing process of the flux cored wires in accordance with a preferable embodiment of the present invention.
Figure 8:
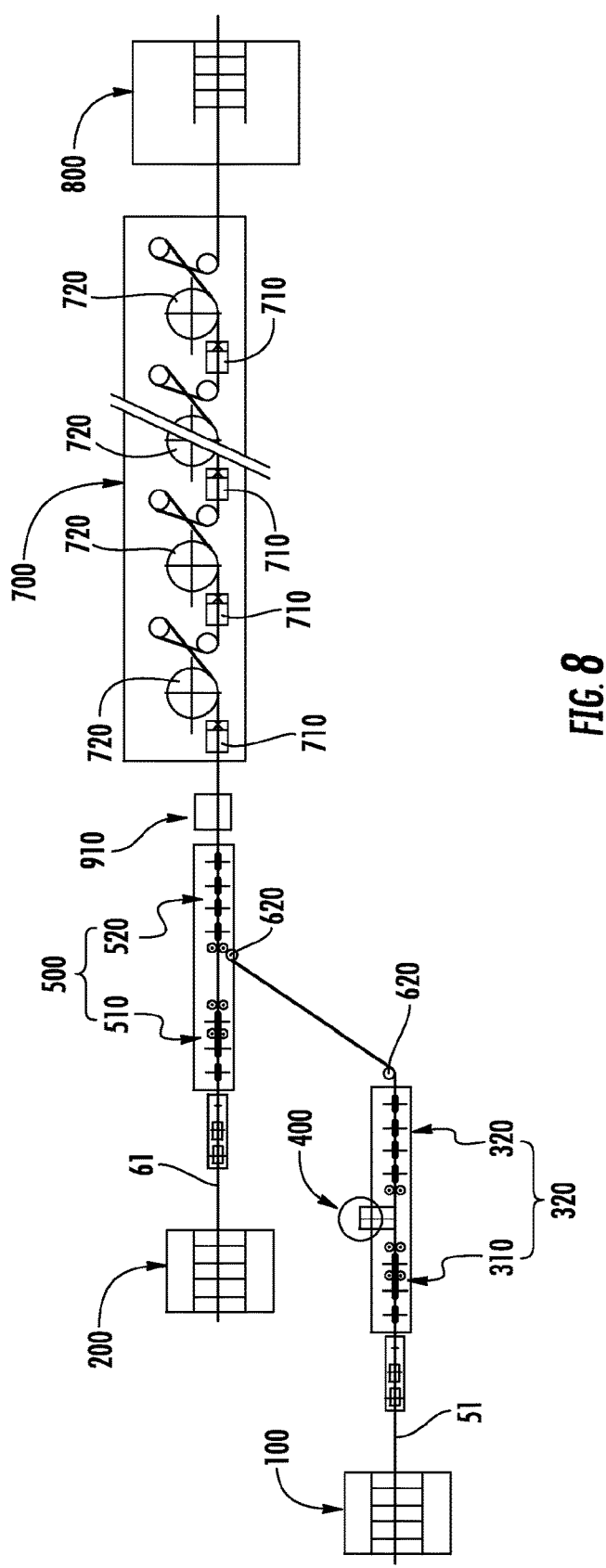
FIG. 8 is a structural view showing the manufacturing system of the flux cored wires in accordance with another preferable embodiment of the present invention.

The manufacturing process of the flux cored wires using the wire processing system in accordance with the embodiment of the present invention is described in further details below by referring to the accompanying drawing FIG. 7.

In the wire processing system, the thin strip 51 for forming inner tubular body 50 is fed from the first strip feeder 100, and the strip 51 is fed into the first forming station 300 to pass through the forming rollers of the first forming portion 310 of the first forming station 300.

In the course of the strip 51 passing through the forming rollers of the first forming portion 310, the side edges 52 of the strip 51 are bent upwards by the forming rollers progressively, so that the cross section of the strip profile becomes a "U" shape. In this process, the strip 51 forms the inner tubular body 50 having the hollow space for filling flux 30 and a part of the circumference is open.

As described earlier, the inner tubular body 50 formed in the first forming portion 310 and a part of the circumference is open then passes through the flux filler 400 where the flux 30 is filled by the flux filler 400. The process is illustrated in FIG. 7(a).

In addition, the quantity of the flux filled in the inner tubular body 50 is 30~40 wt % of the total weight including the inner tubular body 50.

This can prevent the weld defects and process reject ratio caused by insufficient flux filling ratio (less than 30%) and satisfy the ratio of the flux 30 of 12~15% to the entire weight including the outer tubular body 50 to be formed later.

The inner tubular body 50 filled with the flux 30 in the above step is fed into the first closing portion 320 of the first forming station 300 and passed through the forming rollers of the first closing portion 320 described earlier.

While the inner tubular body 50 passes through the forming rollers of the first closing portion 320, as shown in FIG. 7(b), the side edges 52 of the inner tubular body 50 is bent progressively upwards by the forming rollers and closed together. As a result, the inner tubular body 50 is formed into a tube having a very small slit (seam) at the closing part, and then fed into the second forming station 500.

While the inner tubular body 50 is being formed in the above described process, the thin strip 61 for forming the outer tubular body 60 is fed by the second strip feeder 200, and the strip 61 is passed through the second forming portion 510 and the second closing portion 520 which comprise the second forming station 500, sequentially.

While the strip 61 to be formed into the outer tubular body 60 is passed through the forming rollers of the second forming portion 510 and the second closing portion 520, the side edges 62 of the strip are bent progressively upwards to be formed into the outer tubular body 60 which wraps around the inner tubular body 50 which is passed through the flux filler 400 and the second forming station 500. The process is illustrated in FIG. 7(c) and FIG. 7(d).

As a result, the outer tubular body 60 having passed through the second forming station 500 wraps around the inner tubular body 50, as shown in FIG. 7(e), and the inside of the inner tubular body 50 is filled with the flux 30.

It should be noted that, in the above described process, the seam 63 formed by the side edges 62 of the outer tubular body 60 is positioned apart from the seam 53 of the inner tubular body 50 in order to prevent the moisture in the atmosphere from penetrating into the flux 30 in the hollow of the inner tubular body 50.

The outer tubular body 60 containing the inner tubular body 50 and having passed the second forming station 500, is fed into the drawing portion 700. While passing through the drawing portion 700, the diameter of the outer tubular body is reduced into the flux cored wire, as shown in FIG. 7(f), which is wound on the wire reel 800 and brought out.

During the drawing process conducted in the drawing portion 700, the outer tubular body 60 and the inner tubular body 50 are reduced in diameters and become practically an integrated body without boundary interface.

Though the flux cored wires produced in accordance with the method of the present invention comprises an outer tubular body 60 formed with seam 63, the outer tubular body 60 forms practically an integrated body with the inner tubular body 50. As such, there is no gap between the inner and outer tubular bodies through which flux 30 or air can pass. In addition, since the position of the seam 63 of the outer tubular body 60 is apart from that of the seam 53 of the inner tubular body 50, the leak of flux 30 and infiltration of the moisture in the atmosphere can be further prevented.

In addition, the method and apparatus for processing flux cored wires in accordance with the embodiment of the present invention are not limited to processing the flux cored wires with seams.

They are also applicable to the production process of seamless type flux cored wires.

Seamless type flux cored wires can be processed by introducing a welding portion 910 which welds the seam 63 of the outer tubular body 60 formed in the second forming station 500, between the second forming station 500 and the drawing portion 700, and adding the process of seam welding.

The welding portion 910 can be a laser welder, high frequency resistance welder, TIG or other types of welder, as appropriate. Seamless type flux cored wires processed with the welder 910 can prevent the flux 30 from leaking out and the moisture in the atmosphere from infiltrating into the flux. In addition, the electrical conductivity between the wire and welding tip is higher resulting in more stable arc and improved wire feedability.

The flux cored wires in accordance with the present invention, even not applied with the welding for seamless wire structure, can provide a welding material with low hydrogen content, and if applied with the seam welding process, ultra-low hydrogen content welding wire added with stable arc and enhanced feedability can be produced.

NUMBERING SCHEME OF THE MAJOR PARTS OF THE DRAWINGS

30—Flux
50—Inner tubular body
60—Outer tubular body
51, 61—Strip
52, 62—Strip sides
53, 63—Seam
100—First strip feeder
200—Second strip feeder
300—First forming station
310—First forming portion
320—First closing portion
400—Flux filler
500—Second forming station
510—Second forming portion
520—Second closing portion
620—Guided roll
700—Drawing portion
710—Dies
720—Drawing drum
800—Wire reel
910—Welding portion

The invention claimed is:

1. A flux cored wire comprising:
an inner tubular body formed with a first flat strip by curling up side edges of the first flat strip into a tubular body having a first seam and filled with flux inside; and
an outer tubular body formed with a second flat strip by curling up side edges of the second flat strip into a tubular body having a second seam and wrapping around the inner tubular body in tight contact,
wherein the first and second seams of the inner tubular body and the outer tubular body are located at different positions,
wherein diameters of the inner tubular body and the outer tubular body are reduced by a drawing process,
wherein the first and second flat strips of the inner tubular body and the outer tubular body are rolled so that longitudinal edges contact with opposite longitudinal edges to form circular cross-sections, and a thickness of a wall of the outer tubular body is greater than a thickness of a wall of the inner tubular body, and
wherein a ratio of the flux filled inside of the inner tubular body is between 30% to 40% by weight of the entire inner tubular body including the flux, and wherein a ratio of the flux filled inside of the inner tubular body is between 12% to 15% of the total weight of the inner tubular body including the flux and the outer tubular body.

2. The flux cored wire of claim 1, wherein the first and second seams of the inner tubular body and outer tubular body are arranged at different positions away from each other by an interior angle of at least 60 degrees from a center of the inner tubular body and outer tubular body.

3. The flux cored wire of claim 1, wherein the second seam of the outer tubular body is removed by welding.

4. The flux cored wire of claim 2, wherein the interior angle is about 90 degrees.

5. The flux cored wire of claim 1, wherein the inner tubular body and the outer tubular body are formed as an integrated body by the drawing process.

6. The flux cored wire of claim 1, wherein the thickness of the wall of the outer tubular body is 0.6-1.2 millimeters, and the thickness of the wall of the inner tubular body is 0.4-0.8 millimeters.

7. A flux cored wire comprising:
an inner tubular body formed with a first flat strip by curling up side edges of the first flat strip into a tubular body having a first seam and filled with flux inside; and
an outer tubular body formed with a second flat strip by curling up side edges of the second flat strip into a tubular body having a second seam and wrapping around the inner tubular body in tight contact,
wherein the first and second seams of the inner tubular body and the outer tubular body are located at different positions away from each other by an interior angle of at least 60 degrees from a center of the inner tubular body and outer tubular body, and
wherein a ratio of the flux filled inside of the inner tubular body is between 30% to 40% by weight of the entire inner tubular body including the flux, wherein a ratio of the flux filled inside of the inner tubular body is between 12% to 15% of the total weight of the outer tubular body and the inner tubular body including the flux.

8. The flux cored wire of claim 7, wherein the outer tubular body has a wall thickness equal to or greater than a wall thickness of inner tubular body.

9. The flux cored wire of claim 8, wherein the thickness of the wall of the outer tubular body is 0.6-1.2 millimeters, and the thickness of the wall of the inner tubular body is 0.4-0.8 millimeters.

10. The flux cored wire of claim 7, wherein the interior angle is about 90 degrees.

11. The flux cored wire of claim 7, wherein diameters of the inner tubular body and the outer tubular body are reduced by a drawing process.

12. The flux cored wire of claim 11, wherein the inner tubular body and the outer tubular body are formed as an integrated body by the drawing process.

* * * * *